G. P. A. WEISENBORN.
APPARATUS FOR HOLDING PLASTIC MATERIAL ON PLOWS.
APPLICATION FILED JAN. 21, 1916.
1,303,432.
Patented May 13, 1919.
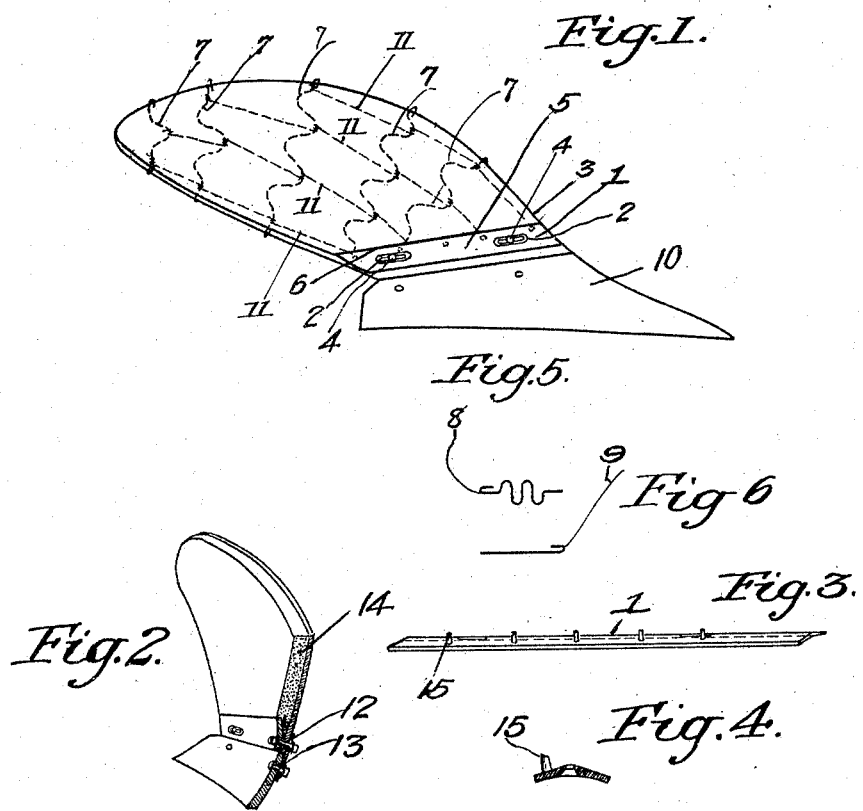
WITNESSES:
INVENTOR

UNITED STATES PATENT OFFICE.

GEORGE P. A. WEISENBORN, OF OKLAHOMA, OKLAHOMA.

APPARATUS FOR HOLDING PLASTIC MATERIAL ON PLOWS.

1,303,432.      Specification of Letters Patent.      Patented May 13, 1919.

Application filed January 21, 1916. Serial No. 73,466.

*To all whom it may concern:*

Be it known that I, GEORGE P. A. WEISENBORN, a citizen of the United States, and a resident of the city, county, and State of Oklahoma, have invented new and useful Improvements in Apparatus for Holding Plastic Material on Plows; and I do declare the following to be a full, clear, and exact description of the invention, such as will enable others skilled in the art to which it appertains to make and use the same.

This invention relates to improvements in plows and has for its object to provide means for holding a plastic material to plow moldboards.

A still further object of the invention is to provide a plow moldboard having a reinforced plastic facing thereon.

Figure 1 is an elevational view of a plow moldboard and share,

Fig. 2 is a sectional view thereof,

Fig. 3 is a detail perspective view of a protector,

Fig. 4 is a section thereof,

Fig. 5 is a detail view of a reinforcing member, and

Fig. 6 is an edge view thereof.

Like reference characters indicate like parts throughout the following specification and in the several views in the drawings, in which 1 is a protector plate secured by bolts 4 to the moldboard 3, said plate is provided with slots 2 with beveled edges to receive the countersunk heads of the bolts 4, said slots permit of adjustment of plate 1. The upper edge 6 of the plate 1 curves outwardly from the moldboard and has pins 15 projecting therefrom for engagement with the wires 11 which are meshed with the spring wires 7 which are formed sinuous and have hook ends 8 which engage edges of the moldboard; similar hooks are provided on the wires 11 for engaging said pins 15 and the edges of the moldboard. The outward curve of the edge 6 of plate 1 forms a shield to prevent rocks, roots, etc., from coming in contact with the surface of the plastic material 14, which is plastered upon the moldboard after the wires 7 and 11 have been sprung into place upon the moldboard. 13 indicates the bolts which hold the plow share 10 to the moldboard 3. The reinforcing and retaining wires 7 and 11, because of the resiliency of the former, adjust themselves to moldboards of different sizes and contours, the wires being placed upon them in position upon the moldboard before being plastered over with the plastic material. After the plastic material has been placed thereover, the wires then become rigid, the entire facing thus being rigidly secured to the moldboard whereby it cannot become acidentally displaced therefrom. However, if the plastic material should become cracked, resiliency is automatically restored to the spring wires, they will contract to a sufficient extent to firmly hold the facing material in place.

When the above described device is secured to the moldboard of a plow, a suitable plastic material may be plastered thereon and will be securely held thereto, said protector plate 1 forming an abutment to hold the lower edge of the plastic material whereby the latter will harden without slipping from the moldboard. The plaster will completely cover the wires 7 and 11 and will be reinforced thereby. The plastic material is of such a character that sticky and gummy soils will not adhere thereto, thus always assuring a clean moldboard, thus greatly facilitating plowing in waxy and sticky land.

Having now described my invention, that which I claim to be new and desire to procure by Letters Patent is:—

In combination with a moldboard, a protector plate secured to the lower portion of said moldboard and curved outwardly at its upper edge, pins projecting inwardly from the upper portion of the said protector plate, sinuous wires secured to said pins and the edge of the moldboard, other wires crossing said sinuous wires and secured thereto, and plastic material covering the moldboard and the wires and extending down to the protector plate, substantially as described.

In witness whereof I have hereunto set my hand this 19th day of January, in the year 1916.

GEORGE P. A. WEISENBORN.

Copies of this patent may be obtained for five cents each, by addressing the "Commissioner of Patents, Washington, D. C."